(12) United States Patent
Hardy et al.

(10) Patent No.: US 10,417,069 B2
(45) Date of Patent: Sep. 17, 2019

(54) HANDLING ZERO FAULT TOLERANCE EVENTS IN MACHINES WHERE FAILURE LIKELY RESULTS IN UNACCEPTABLE LOSS

(71) Applicant: INTERNATIONAL BUSINESS MACHINES CORPORATION, Armonk, NY (US)

(72) Inventors: Clint A. Hardy, Tucson, AZ (US); Matthew G. Borlick, Tucson, AZ (US); Adrian C. Gerhard, Rochester, MN (US); Lokesh M. Gupta, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

(21) Appl. No.: 15/829,701

(22) Filed: Dec. 1, 2017

(65) Prior Publication Data

US 2019/0171509 A1    Jun. 6, 2019

(51) Int. Cl.
*G06F 11/07* (2006.01)
*G06F 11/10* (2006.01)
(Continued)

(52) U.S. Cl.
CPC ........ *G06F 11/0727* (2013.01); *G06F 3/0689* (2013.01); *G06F 9/5011* (2013.01); *G06F 11/1092* (2013.01)

(58) Field of Classification Search
CPC .. G06F 11/0727; G06F 3/0689; G06F 9/5011; G06F 11/1092
See application file for complete search history.

(56) References Cited

U.S. PATENT DOCUMENTS

| | | | |
|---|---|---|---|
| 5,680,539 A | 10/1997 | Jones | |
| 5,684,696 A | * 11/1997 | Rao | B60K 31/0008 318/587 |

(Continued)

FOREIGN PATENT DOCUMENTS

CN    103345450 A    10/2013

OTHER PUBLICATIONS

Lala, Jaynarayan H. et al, "Architectural Principles for Safety-Critical Real-Time Applications", Jan. 1994, Proceedings of the IEEE, vol. 82, No. 1, pp. 25-40 (Year: 1994).*

(Continued)

*Primary Examiner* — Jason B Bryan
*Assistant Examiner* — Indranil Chowdhury
(74) *Attorney, Agent, or Firm* — David W. Victor; Konrad Raynes Davda & Victor LLP

(57) ABSTRACT

Provided are a computer program product, system, and method for managing I/O requests to a storage array of storage devices in a machine having a processor node and device adaptor. In response to initiating a rebuild of data in the storage array, the device adaptor determines whether a remaining fault tolerance at the storage array comprises a non-zero fault tolerance that permits at least one further storage device to fail and still allow recovery of data stored in the storage array. In response to determining that the remaining fault tolerance is a zero fault tolerance that does not permit at least one storage device to fail and allow recovery of data, the device adaptor sends a message to the processor node to cause the processor node to initiate an emergency protocol to terminate a mission critical operation when the processor node is performing the mission critical operation.

22 Claims, 5 Drawing Sheets

(51) Int. Cl.
*G06F 9/50* (2006.01)
*G06F 3/06* (2006.01)

(56) References Cited

U.S. PATENT DOCUMENTS

| | | | |
|---|---|---|---|
| 5,822,584 A | 10/1998 | Thompson et al. | |
| 6,647,514 B1 | 11/2003 | Umberger et al. | |
| 7,016,985 B2 * | 3/2006 | Johnson | G06F 13/20 710/39 |
| 7,139,931 B2 | 11/2006 | Horn | |
| 8,738,880 B2 | 5/2014 | Grusy et al. | |
| 8,751,861 B2 | 6/2014 | Nair et al. | |
| 2009/0210618 A1 * | 8/2009 | Bates | G06F 11/1084 711/114 |
| 2009/0313617 A1 * | 12/2009 | Hung | G06F 11/1092 717/168 |
| 2013/0054891 A1 | 2/2013 | Kawaguchi | |
| 2013/0318297 A1 | 11/2013 | Jibbe et al. | |
| 2015/0301894 A1 * | 10/2015 | Dennett | G06F 11/1092 714/6.24 |
| 2018/0113640 A1 | 4/2018 | Fernandez et al. | |

OTHER PUBLICATIONS

Office Action dated Nov. 23, 2018, pp. 18, for U.S. Appl. No. 15/829,706.
Response dated Feb. 26, 2019, pp. 13, to Office Action dated Nov. 23, 2018, pp. 18, for U.S. Appl. No. 15/829,706.
Office Action dated Mar. 14, 2019, pp. 28, for U.S. Appl. No. 15/829,715.
English translation of CN103345450A filed Oct. 9, 2013, [online] [Nov. 22, 2017] https://patents.google.com/patent/CN103345450A/en?language=ENGLISH.
U.S. Appl. No. 15/829,715, filed Dec. 1, 2017.
U.S. Appl. No. 15/829,706, filed Dec. 1, 2017.
List of IBM Patents or Patent Applications Treated as Related, dated Dec. 1, 2017, pp. 2.
Response dated May 3, 2019, pp. 15, to Office Action dated Mar. 14, 2019, pp. 28, for U.S. Appl. No. 15/829,715.
Final Office Action dated Jun. 10, 2019, pp. 27, for U.S. Appl. No. 15/829,706.

* cited by examiner

HANDLING ZERO FAULT TOLERANCE EVENTS IN MACHINES WHERE FAILURE LIKELY RESULTS IN UNACCEPTABLE LOSS

BACKGROUND OF THE INVENTION

1. Field of the Invention

The present invention relates to a computer program product, system, and method for handling zero fault tolerance events in machines where failure likely results in unacceptable loss.

2. Description of the Related Art

A storage array, such as a Redundant Array of Independent Disks (RAID) array, comprises an array of storage devices, where data in a logical volume or unit of data is striped across the storage devices in the array. When a drive fails in a RAID array, the storage controller or device adaptor managing the RAID array will swap in a new drive and rebuild the RAID array from parity and/or redundancy data along with data on remaining drives. Rebuilding a RAID array is a processor intensive operation which can saturate the processors on the device adapter concurrently managing Input/Output (I/O requests directed to the drives in the RAID array. If the RAID array is experiencing large I/O request traffic, then the rebuild operation may be delayed as the device adaptor has to divert processor resources to processing the I/O requests. If the rebuilding of the RAID array is delayed, then during this time there is a risk that if a failure of another disk occurs, the data in the RAID drives may not be able to be recovered if the number of failed drives exceed the RAID fault tolerance. Further, in mission critical systems, I/O requests cannot be halted while the RAID array is rebuilt.

Thus, there is a need in the art for improved techniques to manage I/O requests at a processor that is also performing an ongoing critical operation, such as rebuilding a RAID array.

SUMMARY

Provided are a computer program product, system, and method for managing I/O requests to a storage array of storage devices in a machine having a processor node and device adaptor. In response to the device adaptor initiating a rebuild of data at the storage devices in the storage array, a determination is made as to whether a remaining fault tolerance at the storage array comprises a non-zero fault tolerance that permits at least one further storage device to fail and still allow recovery of data stored in the storage array. In response to determining that the remaining fault tolerance is a zero fault tolerance that does not permit at least one storage device to fail and allow recovery of data, the device adaptor sends a message to the processor node to cause the processor node to initiate an emergency protocol to terminate a mission critical operation when the processor node is performing the mission critical operation.

DETAILED DESCRIPTION

Figure 1:
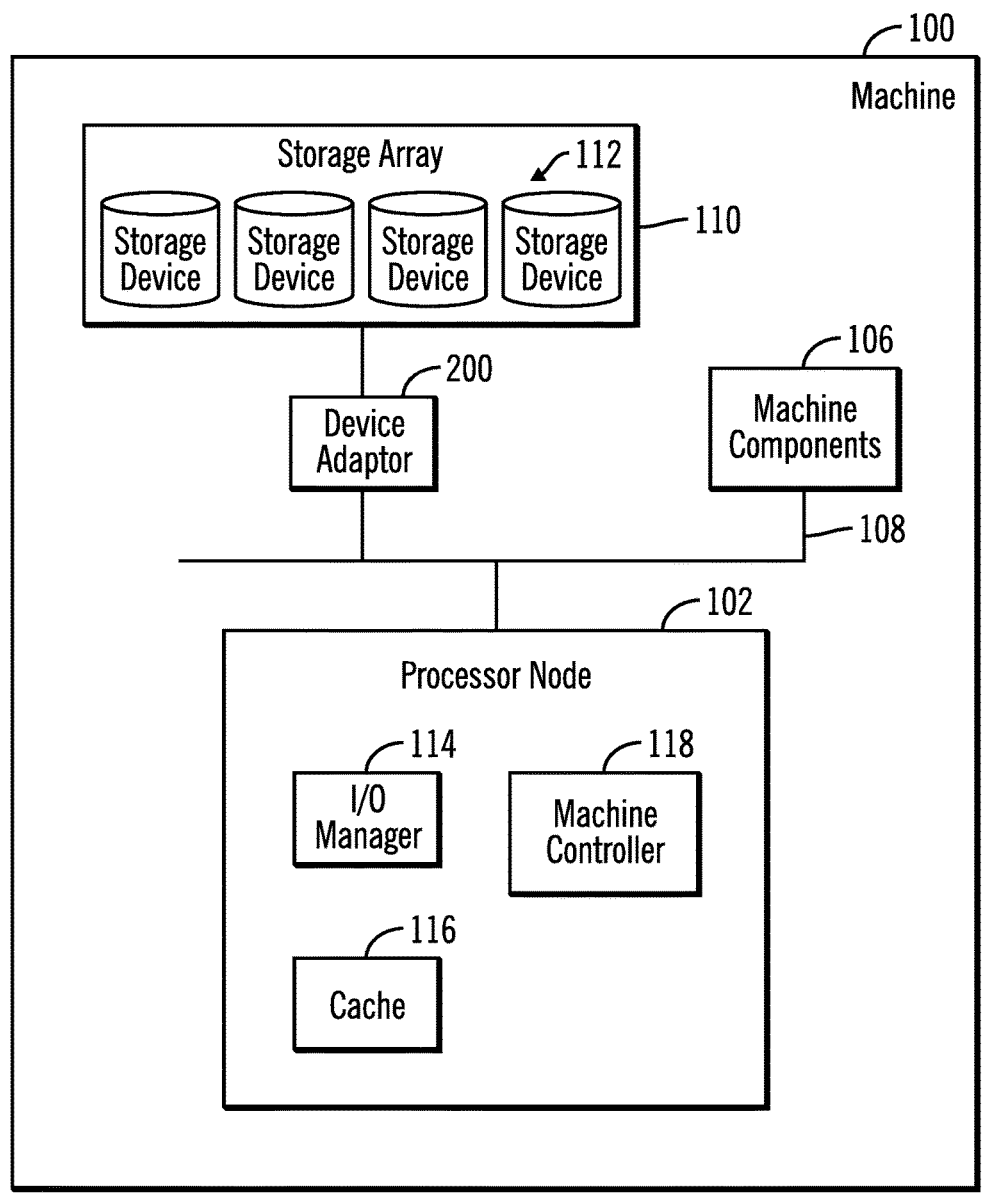
FIG. 1 illustrates an embodiment of a machine having a storage array.

As discussed, a device adaptor, may have to continually process I/O requests even while having to complete an important operation, such as rebuilding a storage array. While the disk is being rebuilt, if another disk failure occurs then there is a risk data may be lost if the fault tolerance of the storage array during the rebuild is zero, or zero disks, meaning the data cannot be rebuilt from the remaining disks in the storage array if another failure occurs. This type of failure can be especially problematic when occurring in systems performing mission critical operations whose failure could result in loss of life and substantial property and monetary loss. For instance, if the storage array and device adaptor are deployed in a vehicle having autonomous operation, such as an automobile, airplane, transportation vehicle, medical system providing life sustaining support, then failure of such a device while performing mission critical operations, such as operating the vehicle in motion or operating the life sustaining device to support life, could result in unacceptable loss, such as serious injury, death or substantial property loss, etc.

Described embodiments provide improvements to computer technology for managing the rebuilding of a storage array when there is a failure of a storage device in a storage array deployed in a machine or device whose failure could result in unacceptable loss. With described embodiments, when rebuilding the storage array following the failure of a storage device in the storage array, a device adaptor determines if the remaining fault tolerance at the storage array permits at least one further storage device to fail and still allow recovery of data stored in the storage array. If the remaining fault tolerance does not allow for recovery of data in the storage array, i.e., zero fault tolerance, then the device adaptor sends a message to the processor node to initiate an emergency protocol to terminate a mission critical operation. In this way described embodiments reduce the risk that the storage array will fail in a non-recoverable manner while a machine in which the storage array is implemented is performing a mission critical operation whose failure could result in unacceptable loss.

Described embodiments further provide an optimization of device adaptor data rebuilding operations when the machine is not performing the mission critical operation or the remaining fault tolerance permits at least one storage device to fail and allow recovery of data, i.e., non-zero fault tolerance. Under these circumstances, the rebuild may continue because there is currently low risk of unacceptable loss if the rebuild fails. To optimize the rebuilding operations, the device adaptor determines whether processor utilization at the device adaptor exceeds a utilization threshold and, if so, the device adaptor sends a message to the processor node to cause the processor node to reduce the rate at which I/O requests are transferred to the device adaptor. With the described embodiments, computer technology is improved because the risk of data loss is reduced by allowing the rebuilding of data in the storage array to complete faster to mitigate the risks if further drives fail, which could result in terminating mission critical operations. Further, by reducing the I/O request rate during the RAID rebuild operation, the drives experience less stress, which reduces the risk the drives will fail during the rebuild operation.

Described embodiments improve the computer technology for machines performing mission critical operations where failure may result in unacceptable loss, e.g., life and property, by providing techniques for a processor, such as a device adaptor, rebuilding data in a storage array, to reduce the risk of mission critical failure by causing the machine to terminate the mission critical operation or by throttling requests from the machine to allow the storage array data to be rebuilt faster.

FIG. 1 illustrates an embodiment of a machine 100 to perform a mission critical operation including a processor node 102 to perform the processing and control of machine related operations, a device adaptor 200 to manage access to the storage devices 112, and machine components 106 to perform machine operations, all of which may connect over one or more bus interfaces 108. The machine 100 may comprise an autonomous operating vehicle, such as an automobile, airplane, drone, submarine, spacecraft, transportation vehicle, such as trucks, trains, light rail, subway, functional vehicles, such as forklifts, farming machinery, an assembly line or manufacturing device, a medical system to provide life sustaining support to patients, Heating, ventilation, and air conditioning (HVAC), crucial building and facility controls, etc. The machine 100 may perform mission critical operations concerning its specific use, such as operating the vehicle in motion or providing life sustaining support, and perform non-critical operations while at rest or not performing mission critical operations, such as updating code, communicating with operators, performing diagnostics, etc.

The machine 100 includes a storage array 110 having a plurality of storage devices 112 in which logical volumes and tracks are configured, such as a RAID array. The processor node 102 includes an I/O manager 114 to manage I/O requests directed to the storage array 110 that are generated as part of machine component 106 and other operations. The processor node 102 may further include a cache 116 to cache data from the storage array 110 and a machine controller 118 comprising code executed to control the machine components 106 to perform machine related operations, such as mission critical operations, e.g., operate the vehicle in motion, provide life sustaining support, etc.

In the embodiment of FIG. 1, one processor node 102 and device adaptor 200 are shown. In further embodiments, there may be redundant instances of the computing elements 102, 200, 108 to allow for failover in the event one of the components fails.

The storage devices 112 in the storage array 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of the storage devices 112, such as Just a Bunch of Disks (JBOD), Direct Access Storage Device (DASD), Redundant Array of Independent Disks (RAID) array, virtualization device, etc. Further, the storage devices 112 in the storage array 110 may comprise heterogeneous storage devices from different vendors and different types of storage devices, such as a first type of storage devices, e.g., hard disk drives, that have a slower data transfer rate than a second type of storage devices, e.g., SSDs.

Figure 2:
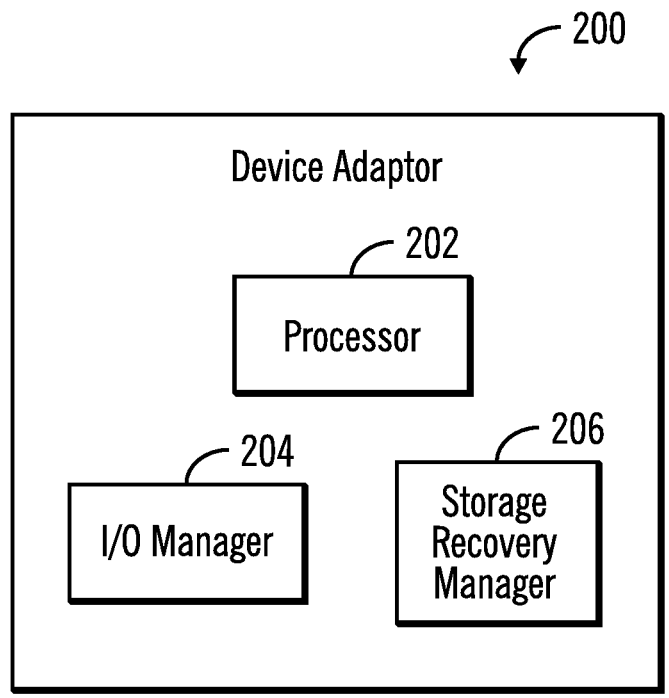
FIG. 2 illustrates an embodiment of a device adaptor.

FIG. 2 illustrates an embodiment of the device adaptor 200, including a processor 202, such as one or more processor devices, an I/O manager 204 executed by the processor 202 to manage the execution of I/O requests from the processor node 102 with respect to the storage devices 112, and a storage recovery manager 206 to recover from a failure at one of the storage devices 112. In embodiments where one or more RAID arrays, or other logical storage units, are configured in the storage devices 112, the storage recovery manager 206 may rebuild a RAID array in available storage devices 112, if one or more of the storage devices fail, using parity and/or redundant data to reconstruct data on the failed storage devices 112. In RAID embodiments, the I/O manager 204 may include RAID algorithms to stripe data across the storage devices 112 and generate parity or redundancy data to stripe data across the storage devices 112, where the parity and/or redundancy data is used if one or more storage devices in which the RAID array is configured fails. Various RAID levels use parity or various forms of redundancy data to recreate data in the event of one or more failures. The term "parity" refers to, without limitation, any form of redundancy data such as XOR parity, Reed-Solomon encoded redundancy data, ECC, etc. that is applicable for a given RAID implementation.

The components, such as the I/O manager 114, machine controller 118, device adaptor I/O manager 204, and storage recovery manager 206 may be implemented in computer readable program instructions in a computer readable storage medium executed by a processor and/or computer hardware, such as an Application Specific Integrated Circuit (ASIC). The machine components 106 may include digital servo controllers to control machine components to perform and control the mission critical operations.

Figure 3:
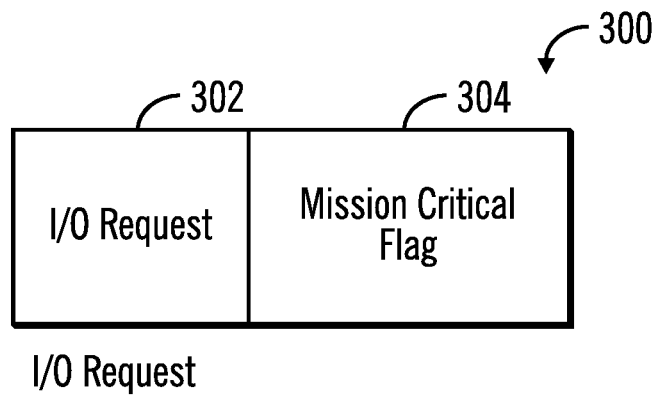
FIG. 3 illustrates an embodiment of an I/O request.

FIG. 3 illustrates an embodiment of an I/O request 300 the processor node I/O manager 114 sends to the device adaptor 200 as including the I/O request portion 302 and a mission critical flag 304 indicating whether the I/O request 300 is generated from the mission critical operation of the machine 100, as opposed to a non-mission critical operation.

With the embodiment of FIG. 3, the device adaptor I/O manager 204 may determine whether the I/O request is generated from a mission critical operation in the machine 100 from the flag 304. In an alternative embodiment, different logical units configured in the storage devices 112 may be used for mission critical and non-mission critical data, such that the device adaptor 200 may determine whether an I/O request is for a mission critical or non-mission critical operation based on the target logical unit or target address to which the I/O request is directed.

Figure 4:
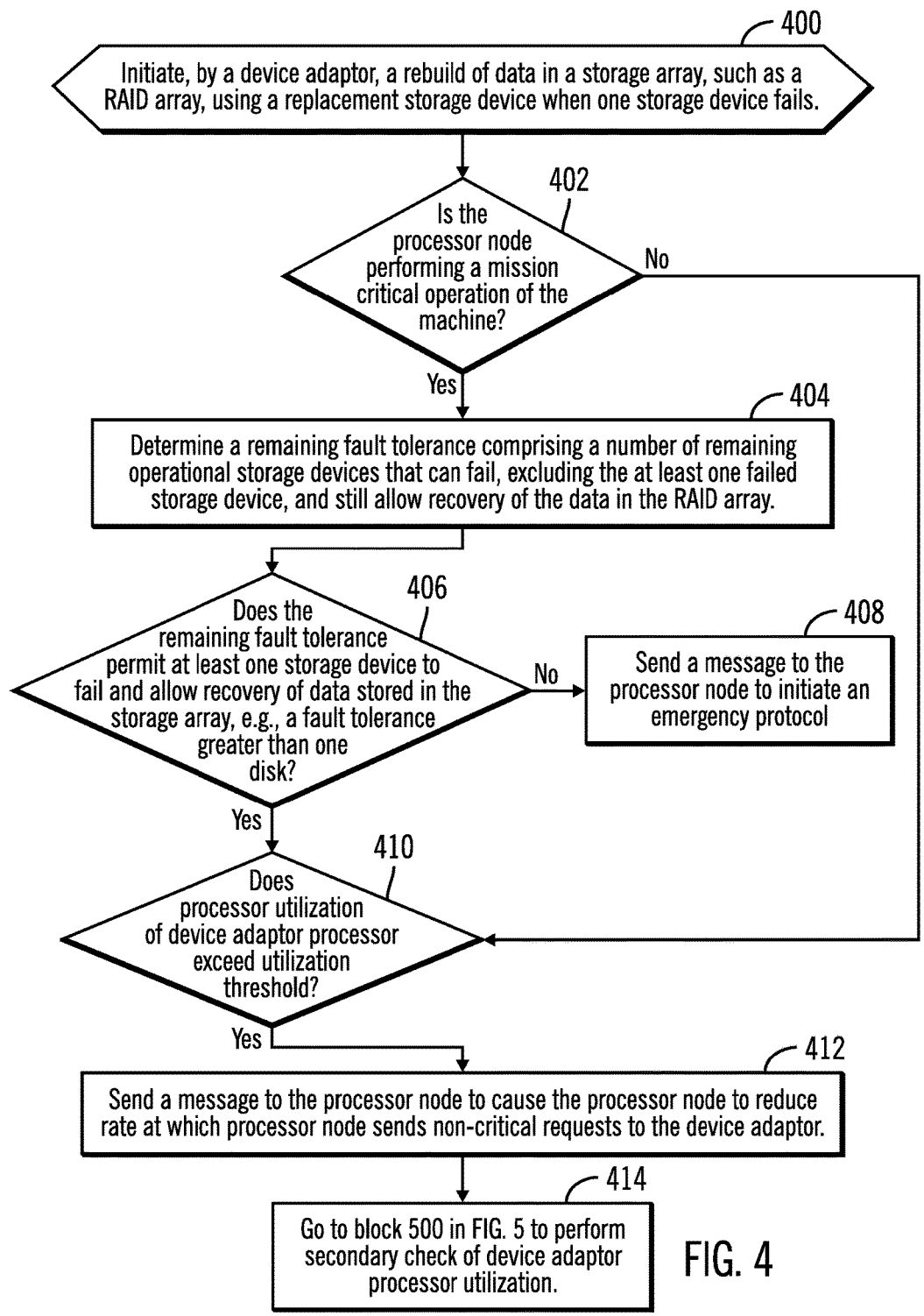
FIGS. 4, 5, and 6 illustrates embodiments of operations for a device adaptor and processor node to manage zero fault tolerance in the storage array when rebuilding data from a failed storage device in the storage array.

FIG. 4 illustrates an embodiment of operations performed by the device adaptor I/O manager 204 when rebuilding data in the storage array 110 in a replacement storage device when one of the storage devices 112 fails, such as an operation to rebuild a RAID array. Upon initiating (at block 400) the rebuild operation, the device adaptor 200 determines (at block 402) whether the processor node 102 is performing a mission critical operation. This may be determined by the device adaptor 200 querying the processor node 102 or the processor node 102 notifying the device adaptor 200 when mission critical operations are initiated. If (at block 402) a mission critical operation is being performed, then the device adaptor I/O manager 204 determines (at block 404) a remaining fault tolerance comprising a number of remaining operational storage devices 112 that can fail, excluding the at least one failed storage device, and still allow recovery of the data in the storage array 110. If (at block 406) the remaining fault tolerance does not permit at least one storage device 112 to fail and allow recovery of data stored in the RAID array 110, i.e., zero fault tolerance, then the device adaptor I/O manager 204 sends (at block 408) a message to the processor node 102 to initiate an emergency protocol. The emergency protocol may cause the processor node 102 to initiate a graceful termination of the mission critical operation. For instance, if the machine 100 is a vehicle, then the emergency protocol may cause the processor node 102 to bring the vehicle to a rest state. If the machine 100 is providing life sustaining support, then the emergency protocol may comprise alerts or operations to have another machine replace the machine 100 to provide the life sustaining support.

If (at block 406) the remaining fault tolerance permits at least one storage device 112 to fail and allow recovery of data stored in the RAID array 110, e.g., non-zero fault tolerance, then the device adaptor I/O manager 204 determines (at block 410) whether a processor utilization, such as at the processor 202, exceeds a utilization threshold. If (at block 410) the threshold is exceeded, then the device adaptor I/O manager 204 sends (at block 412) a message to the processor node 102 to cause the processor node 102 to reduce the rate at which I/O requests are transferred to the device adaptor 200. In certain embodiments, the message may cause the processor node 102 to reduce the rate of transferring requests by at least one of adding a delay to service requests at the processor node and reduce resources (e.g., threads or tasks, queues, queue depth, memory, etc.) in the processor node 102 to service the requests.

Figure 5:
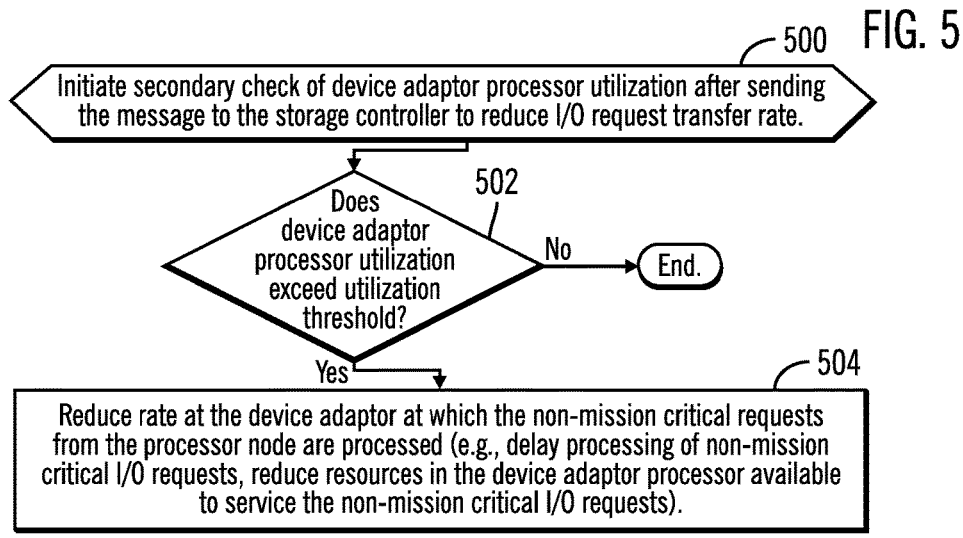

After an interval following the sending of the message to cause the processor node to reduce the rate at which request are transferred, the device adaptor I/O manager 204 may proceed to block 500 in FIG. 5 to initiate a secondary check of the device adaptor processor 202 utilization. As part of the secondary check, if (at block 502) the device adaptor processor 202 exceeds the utilization threshold, then the processor node 102 reduction of the rate of sending requests has not succeeded in reducing the burdens on the device adaptor processor 202 utilization. In such case, the device adaptor I/O manager 204 may reduce (at block 504) the rate at the device adaptor 200 at which the non-mission critical requests from the processor node 102 are processed, such as to delay processing of non-mission critical I/O requests, reduce resources in the device adaptor processor 202 available to service the non-mission critical I/O requests (e.g., tasks or threads, queues, queue depth, memory, etc.). If (at block 502) the device adaptor processor 202 utilization does not exceed the utilization threshold, then control ends because the reductions in the transfer rate of I/O requests from the processor node 102 succeeded in lowering the device adaptor processor utilization to acceptable levels.

Figure 6:
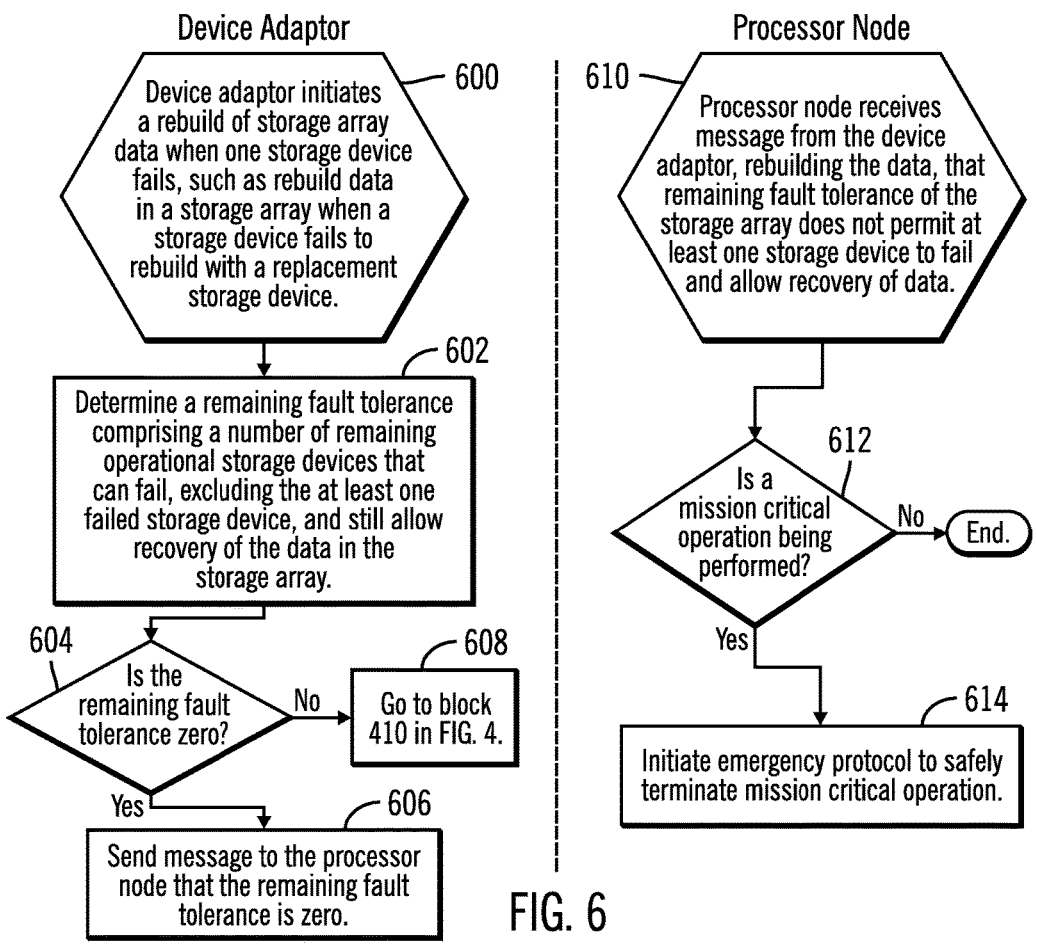

FIG. 6 illustrates an alternative embodiment of operations performed at the device adaptor 200 and processor node 102, such as at the I/O managers 204 and 114 therein, respectively, for the device adaptor 200 to cause the processor node 102 to reduce I/O request transfer rate to reduce the device adaptor 200 utilization. Upon the device adaptor 200 initiating (at 600) a rebuild of data at the storage array 110 when one storage device 112 fails, such as to rebuild data in a storage array with a replacement storage device for the failed storage device, the device adaptor 200 determines (at block 602) a remaining fault tolerance comprising a number of remaining operational storage devices 112 that can fail, excluding the at least one failed storage device, and still allow recovery of the data in the storage array. If (at block 604) the remaining fault tolerance is non-zero, meaning a failure of one or more storage devices 112 will not result in data loss, then control proceeds to block 410 in FIG. 4 to determine whether the processor node 102 needs to reduce transmitting I/O requests to reduce processor utilization at the device adaptor 200 rebuilding the data for storage array.

If (at block 604) the remaining fault tolerance is zero, a failure of any storage device 112 will result in data loss, then the device adaptor 200 sends (at block 606) a message to the processor node 102 that the remaining fault tolerance is zero, or some other type of message indicating that there is a heightened risk of data loss. In response to the message, the processor node 102 determines (at block 612) whether a mission critical operation is being performed. If not, control ends. If so, then the processor node 102 initiates (at block 614) an emergency protocol to safely terminate the mission critical operation.

With the described embodiments of FIGS. 4, 5, and 6, if while rebuilding data in the storage array after a disk failure, either no mission critical tasks are performed or fault tolerance is non-zero, then the device adaptor 200, processing requests from the processor node 102 having a high device adaptor processor utilization, may send a message to the processor node 102 to reduce the rate at which non-mission critical requests are transmitted to the device adaptor to reduce processing burdens on the device adaptor 200 while rebuilding a storage array, e.g., RAID array. Reducing the burden of processing I/O requests frees device adaptor 200 processor resources to optimize rebuilding the storage array without experiencing delays from high processor utilization resulting from processing non-critical operation I/O requests. If however, mission critical tasks are being performed while the data in the storage array is being rebuilt and the current fault tolerance is zero, then actions are initiated to cause the processor node 102 to cease the mission critical operations to avoid potential unacceptable loss, including loss of life and property.

Figure 7:
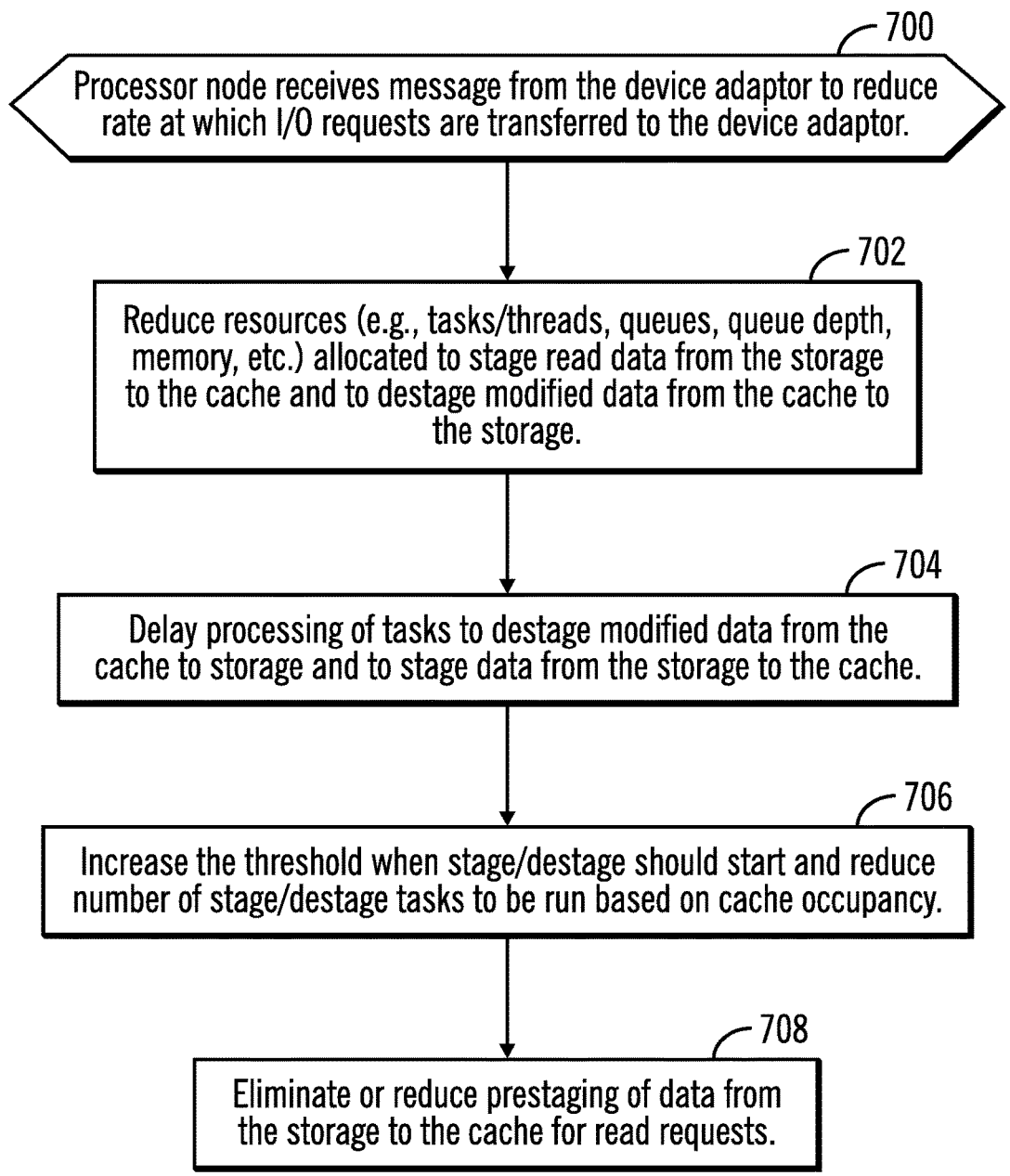
FIG. 7 illustrates an embodiment of operations for the processor node to reduce a rate at which I/O requests are transmitted to the device adaptor.

FIG. 7 illustrates an embodiment of operations performed by the processor node 102 in response to receiving a message from the device adaptor 200 to reduce the rate of I/O request transfer to the device adaptor 200. Upon receiving (at block 700) the message, the processor node I/O manager 114 may perform one or more of the operations of 702, 704, 706, and 708. At block 702, the I/O manager 114 may reduce resources (e.g., tasks/threads, queues, queue depth, memory, etc.) allocated to stage read data from the storage array 110 to the cache 116 and to destage modified data form the cache 116 to the storage array 110 to reduce the I/O traffic to the device adaptor 200. At block 704, the I/O manager 114 may delay processing of tasks to destage modified data from the cache 116 to the storage array 110 and to stage data from the storage array 110 to the cache 116 to reduce the I/O traffic to the device adaptor 200. At block 706, the I/O manager 114 may increase the threshold when stage/destage should start and reduce number of stage/destage tasks to be run based on cache 116 occupancy. At block 708, the I/O manager 114 eliminates or reduces prestaging of data from the storage array 110 to the cache 116 in anticipation of read requests, such as sequential read requests, that will request the data.

With the embodiment of FIG. 7, the I/O manager 114 may take different actions to reduce the rate at which I/O requests are sent to the device adaptor 200 to reduce processor 202 utilization at the device adaptor 200 from I/O requests so that more device adaptor processor 202 resources are available to rebuild the storage array.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing I/O requests to a storage array of storage devices in a machine having a processor node and device adaptor, the computer program product comprising a computer readable storage medium having computer readable program code embodied therein that is executable to perform operations, the operations comprising:

in response to the device adaptor initiating a rebuild of data at the storage devices in the storage array, determining whether a remaining fault tolerance at the storage array comprises a non-zero fault tolerance that permits at least one further storage device of the storage devices to fail and still allow recovery of data stored in the storage array; and in response to determining that the remaining fault tolerance is a zero fault tolerance that does not permit at least one storage device to fail and allow recovery of data, sending, by the device adaptor, a message to the processor node to cause the processor node to initiate an emergency protocol to terminate a mission critical operation when the processor node is performing the mission critical operation.

2. The computer program product of claim 1, wherein the operations further comprise:

determining, by the device adaptor, whether the processor node is performing the mission critical operation in response to the initiating the rebuild of data, wherein the message is sent to the processor node in response to determining that the processor node is performing the mission critical operation and the remaining fault tolerance is the zero fault tolerance.

3. The computer program product of claim 1, wherein the operations further comprise:

determining, by the processor node, whether the mission critical operation is being performed in response to receiving the message; and initiating, by the processor node, the emergency protocol in response to determining that the mission critical operation is being performed.

4. The computer program product of claim 1, wherein the mission critical operation comprises an operation of the machine, and wherein the emergency protocol comprises a procedure to mitigate harm resulting from failure of the machine and the mission critical operation.

5. The computer program product of claim 4, wherein the machine comprises a vehicle, wherein the mission critical operation comprises operation of the vehicle in motion, and wherein the emergency protocol comprises transitioning the vehicle in motion to a rest state.

6. The computer program product of claim 4, wherein the emergency protocol comprises sending an alert to provide a substitute machine to perform the mission critical operation in place of the machine having the zero fault tolerance.

7. The computer program product of claim 1, wherein the message sent to cause the processor node to initiate the emergency protocol comprises a first message, wherein the operations further comprise:

determining, by the device adaptor, whether processor utilization at the device adaptor exceeds a utilization threshold in response to determining at least one of that the processor node is not performing the mission critical operation and that the remaining fault tolerance is the non-zero fault tolerance; and sending, by the device adaptor, a second message to the processor node to cause the processor node to reduce a rate at which requests are transferred from the processor node to the device adaptor in response to determining that the processor utilization at the device adaptor exceeds the utilization threshold.

8. The computer program product of claim 7, wherein the second message causes the processor node to reduce the rate at which non-mission critical related requests are transferred to the device adaptor, and wherein the message does not cause a reduction in the rate at which mission critical related requests are transferred to the device adaptor.

9. The computer program product of claim 7, wherein the processor utilization comprises a device adaptor utilization, wherein the operations further comprise:

determining by the device adaptor whether a device adaptor utilization exceeds the utilization threshold after sending the message; and reducing, by the device adaptor, a rate at which non-mission critical related requests from the processor node are processed at the device adaptor in response to determining that the device adaptor utilization exceeds the utilization threshold.

10. The computer program product of claim 9, wherein the reducing, by the device adaptor, the rate at which non-mission critical related requests from the processor node are processed comprises:
   determining from metadata transmitted with a request, whether the request is a mission critical related request or a non-mission critical related request, wherein the device adaptor reduces the rate at which the request is processed in response to determining that the request comprises the non-mission critical related request.

11. The computer program product of claim 9, wherein the reducing the rate at which non-mission critical requests are processed comprises at least one of adding a delay to service the non-mission critical requests at the processor node, reducing resources assigned to service the non-mission critical requests, and quiescing performing any non-mission critical related requests.

12. The computer program product of claim 1, wherein the storage devices are configured as a Redundant Array of Independent Disks (RAID) array, and wherein the rebuilding of data at the storage devices comprises rebuilding the RAID array using a replacement storage device for a failed storage device of the storage devices.

13. A system for managing I/O requests, comprising:
   a processor node;
   a storage array of storage devices;
   a device adaptor managing access to the storage array, wherein the device adaptor performs operations, the operations comprising:
      in response to initiating a rebuild of data at the storage devices in the storage array, determining whether a remaining fault tolerance at the storage array comprises a non-zero fault tolerance that permits at least one further storage device of the storage devices to fail and still allow recovery of data stored in the storage array; and
      in response to determining that the remaining fault tolerance is a zero fault tolerance that does not permit at least one storage device to fail and allow recovery of data, sending a message to the processor node to cause the processor node to initiate an emergency protocol to terminate a mission critical operation when the processor node is performing the mission critical operation.

14. The system of claim 13, wherein the mission critical operation comprises an operation of a machine, and wherein the emergency protocol comprises a procedure to mitigate harm resulting from failure of the machine and the mission critical operation.

15. The system of claim 13, wherein the message sent to cause the processor node to initiate the emergency protocol comprises a first message, wherein the device adaptor further performs:
   determining whether processor utilization at the device adaptor exceeds a utilization threshold in response to determining at least one of that the processor node is not performing the mission critical operation and that the remaining fault tolerance is the non-zero fault tolerance; and
   sending a second message to the processor node to cause the processor node to reduce a rate at which requests are transferred from the processor node to the device adaptor in response to determining that the processor utilization at the device adaptor exceeds the utilization threshold.

16. The system of claim 15, wherein the second message causes the processor node to reduce the rate at which non-mission critical related requests are transferred to the device adaptor, and wherein the message does not cause a reduction in the rate at which mission critical related requests are transferred to the device adaptor.

17. The system of claim 15, wherein the processor utilization comprises a device adaptor utilization, wherein the operations further comprise:
   determining by the device adaptor whether a device adaptor utilization exceeds the utilization threshold after sending the message; and
   reducing, by the device adaptor, a rate at which non-mission critical related requests from the processor node are processed at the device adaptor in response to determining that the device adaptor utilization exceeds the utilization threshold.

18. A method for managing I/O requests to a storage array of storage devices in a machine having a processor node and device adaptor, comprising:
   in response to the device adaptor initiating a rebuild of data at the storage devices in the storage array, determining whether a remaining fault tolerance at the storage array comprises a non-zero fault tolerance that permits at least one further storage device of the storage devices to fail and still allow recovery of data stored in the storage array; and
   in response to determining that the remaining fault tolerance is a zero fault tolerance that does not permit at least one storage device to fail and allow recovery of data, sending, by the device adaptor, a message to the processor node to cause the processor node to initiate an emergency protocol to terminate a mission critical operation when the processor node is performing the mission critical operation.

19. The method of claim 18, wherein the mission critical operation comprises an operation of the machine, and wherein the emergency protocol comprises a procedure to mitigate harm resulting from failure of the machine and the mission critical operation.

20. The method of claim 18, wherein the message sent to cause the processor node to initiate the emergency protocol comprises a first message, further comprising:
   determining, by the device adaptor, whether processor utilization at the device adaptor exceeds a utilization threshold in response to determining at least one of that the processor node is not performing the mission critical operation and that the remaining fault tolerance is the non-zero fault tolerance; and
   sending, by the device adaptor, a second message to the processor node to cause the processor node to reduce a rate at which requests are transferred from the processor node to the device adaptor in response to determining that the processor utilization at the device adaptor exceeds the utilization threshold.

21. The method of claim 20, wherein the second message causes the processor node to reduce the rate at which non-mission critical related requests are transferred to the device adaptor, and wherein the message does not cause a reduction in the rate at which mission critical related requests are transferred to the device adaptor.

22. The method of claim 20, wherein the processor utilization comprises a device adaptor utilization, further comprising:

determining by the device adaptor whether a device adaptor utilization exceeds the utilization threshold after sending the message; and reducing, by the device adaptor, a rate at which non-mission critical related requests from the processor node are processed at the device adaptor in response to determining that the device adaptor utilization exceeds the utilization threshold.

\* \* \* \* \*